March 27, 1934.    F. J. BAST    1,952,050
DEFROSTING MECHANISM
Filed March 17, 1932
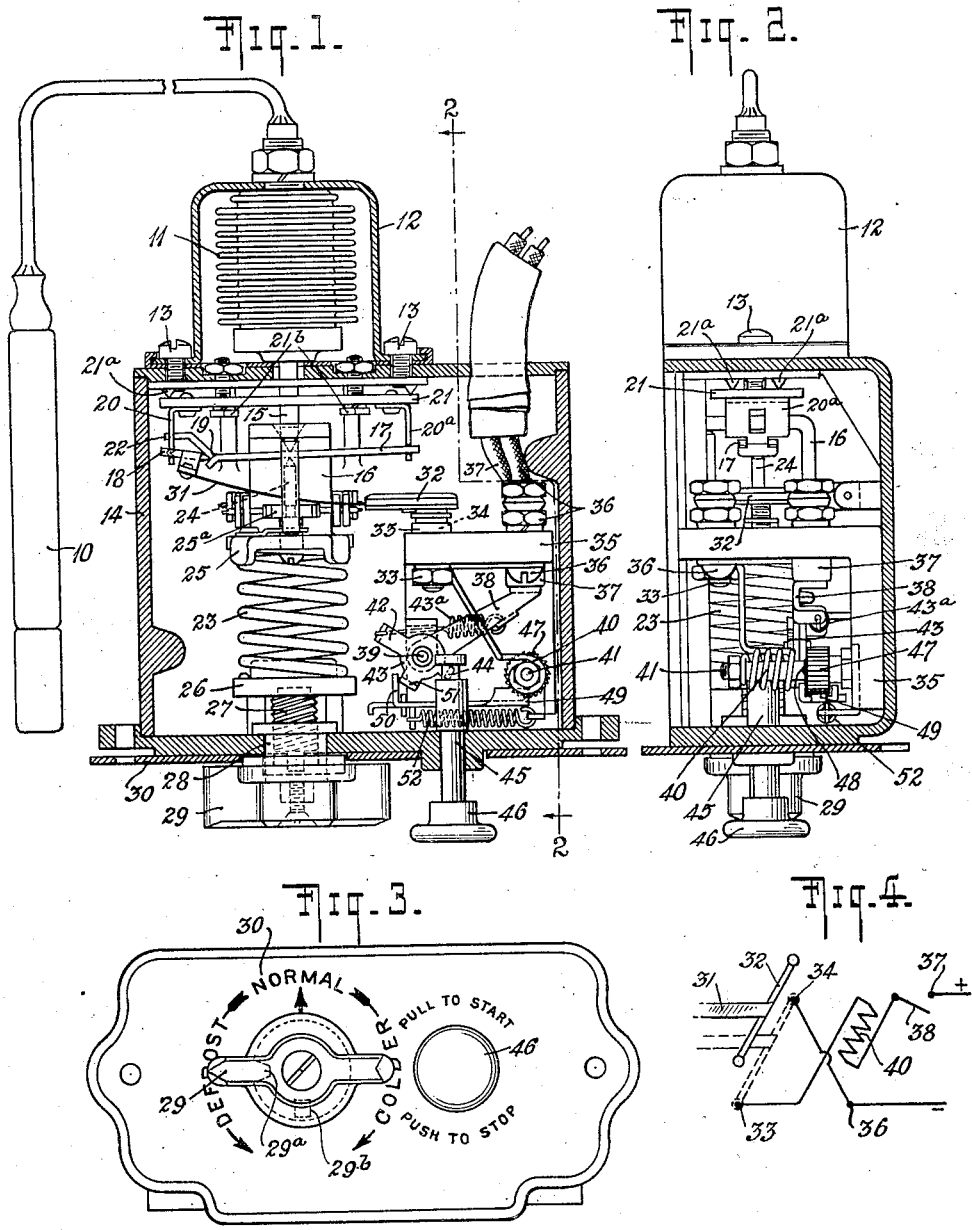
WITNESS
G. V. Rasmussen
INVENTOR
FRANK J. BAST
BY
Nielsen Schuent
ATTORNEYS Patented Mar. 27, 1934

1,952,050

UNITED STATES PATENT OFFICE 1,952,050

DEFROSTING MECHANISM

Frank J. Bast, Queens Village, N. Y., assignor to Charles J. Tagliabue Mfg. Co., Brooklyn, N. Y., a corporation of New York Application March 17, 1932, Serial No. 599,380

12 Claims. (Cl. 62—4)

The present invention relates to the temperature control of automatic refrigerators, and particularly to mechanism whereby the flow of operating fluid, such as electric current or gas to the motor or boiler of the refrigerator is stopped when certain conditions occur or are desired.

The invention will be described as applied to an electric refrigerator, but it will be apparent that the invention may also be utilized in refrigerators of the absorption type operated with gas or other fuel.

The maintenance of predetermined temperatures within a refrigerator, especially those of the household type, is generally effected by means of temperature responsive mechanism which is arranged to control a switch in the circuit of the motor of the compressor. As, for reasons of economy, a motor of the lowest possible capacity is used, it is necessary to provide an overload cut-out to prevent burning out of the motor windings if the motor is started when the refrigerator is abnormally warm (say approximately room temperature), at which time an excessive load is placed on the motor because of the increased vapor pressure of the refrigerant. Also, manually operated means are usually provided for permanently stopping the motor (i. e. free it of the control of the temperature responsive mechanism) when it is desired to defrost the evaporator. Such automatic cut-out and manually operated means heretofore have been associated with the switch which is controlled by the temperature responsive mechanism, the manual means being movable to open the switch for effecting defrosting, and the automatic cut-out operating to open the switch when the load on the motor becomes excessive (as when the housewife, after opening the switch, neglects to close the same when the ice on the evaporator has melted, and thereby permits the refrigerator to become too warm).

I have found that it is highly undesirable for the switch which is controlled by the temperature responsive mechanism to be operated also by the manual and the automatic cut-out devices. Investigation has shown that when the same switch is controlled by the temperature responsive mechanism and also by one or both of the manual and automatic cut-out devices, the switch and/or the parts of the temperature responsive mechanism associated therewith are frequently placed under stresses which impair the proper operation of the control mechanism, such stresses being capable of permanently distorting the delicate parts of the mechanism. Thus, the sudden opening of the switch by the cut-out mechanism at a time when the temperature responsive mechanism is urging said switch to the closed position subjects the switch and the elements associated therewith to opposing forces which may bend or twist parts of the mechanism and render the operation thereof unreliable.

It is accordingly an object of the invention to provide an arrangement wherein the switch actuated by the temperature responsive mechanism is not influenced or operated by the manually operated mechanism for effecting defrosting or by the automatic cut-out mechanism. In accordance with the invention, I provide a separate switch in series with the just mentioned switch and controlled exclusively by the manually operated defrosting member and by the automatic cut-out. Both switches are thus placed under only a single force at any time and the danger of bending or distortion of the mechanism is thus eliminated, and accurate and reliable operation of the instrument assured.

The invention will be further described in connection with the accompanying drawing which illustrates by way of example an embodiment of the invention as applied to the control of an electrically operated refrigerator. In said drawing, Fig. 1 is a plan view, with the casings in section, of my improved arrangement;

Fig. 2 is a section on the line 2—2 of the structure shown in Fig. 1;

Fig. 3 is a front face view showing the temperature control knob and associated dial; and Fig. 4 is a diagram of the electrical connections.

In the mechanism illustrated, the temperature within an electrically-operated refrigerator is maintained with the aid of a temperature responsive switch mechanism which controls the circuit of the motor of the compressor and operates to start the motor when the temperature in the refrigerator rises above a maximum predetermined by the setting of the mechanism, and to disconnect the motor when the temperature reaches a predetermined minimum. This temperature responsive mechanism may be of any suitable type, such as that disclosed in my co-pending application, Serial No. 548,520, filed July 3, 1931, the essential features of which are illustrated in Figs. 1 and 2 of the drawing. It will, however, be understood that my invention is equally applicable to the control of the flow of gas to a gas-operated refrigerator, and may readily be embodied in a temperature responsive valve regulator, such as is described in my copending application, Serial No. 424,768, filed January 31, 1930.

As shown, the control mechanism includes a thermostatic bulb 10 containing an expansible fluid and adapted to be positioned at a suitable place in the refrigerator, such bulb being connected with an expansible member, such as a capsular spring or bellows 11, disposed within a casing 12 attached in any suitable manner, as by screws 13, with the main casing 14 of the instrument. A rod 15 is connected with the bellows 11 to be moved thereby and projects into the interior of casing 14 where its pointed end passes through a tapered opening in the upper horizontal arm of a U-shaped yoke 16 and engages one of a pair of plates 17, 18 arranged to operate as a toggle, the beveled sides of the end of the rod bearing against the walls of the opening so as to move the yoke as the bellows expands. The two plates engage each other along a knife edge 19 and are provided with knife edges at their outer ends wherewith they engage resilient supports 20, 20a mounted upon a base 21 bearing against knife edges 21a and fixed to the casing 14 by adjustable screws 21b. The plate 17 is provided with an offset finger 22 which engages in an opening in support 20 and serves to limit the movement of the toggle 17, 18, in both directions.

The expansive movement of the bellows 11 is opposed by a spring 23 which actuates a rod 24 whose pointed end is arranged to engage the side of the plate 17 opposite that engaged by the rod 15. The rod 24 is in screw-threaded engagement with a plate 25 forming part of the yoke 16 and is provided with a nut 25a rigid therewith and by rotation of which the rod may be adjusted. The other end of spring 23 rests upon a plate 26 against which bears a screw 27 which is adjusted longitudinally by means of a nut 28, fixed to a rotatable knob or pointer 29 located outside of the casing and cooperating with a dial 30. The interior of the knob is hollow and is provided with a lug 29a which is arranged to engage a stop 29b on the casing to limit the movements of the knob.

To the shorter plate 18 of the toggle 17, 18 is attached a resilient arm 31 carrying a jumper 32 adapted to bridge a pair of terminals 33, 34 located in the circuit of the motor (not shown) of the refrigerator and mounted on an insulating bracket 35. By rotation of the pointer 29 in a clockwise direction (Fig. 3), the tension of the spring 23 is decreased, and thereby the temperature at which the bellows 11 causes the toggle 17, 18 to snap downwardly to close the terminals 33, 34 for starting the motor is reduced; in other words, the refrigerator is set for a colder temperature. Movement of the pointer in the opposite direction, on the other hand, increases the resistance of spring 23, and a higher temperature must be reached in the refrigerator before the switch arm 31 is thrown to close the terminals 33, 34.

As will be seen from the drawing, the terminals 33 and 34 and the jumper 32 which cooperates therewith are controlled exclusively by the temperature responsive mechanism through the toggle arrangement 17, 18, and the resilient switch arm 31. As explained in the introduction to this specification, any force applied to the jumper or switch 32 in addition to that exerted by the bellows 11 is exceedingly liable to cause permanent bending or distortion of the resilient arm 31 and of the parts connected therewith. Thus it will be seen that if the jumper 32 is in the position shown in Fig. 1 and a sudden force is directed against it from below in order to open the circuit, there would be great danger of injury to the arm 31 and to the toggle 17, 18 which is at such time being forced downwardly by the bellows 11.

In accordance with the present invention, I provide an additional pair of terminals 36 and 37 which are likewise arranged in the circuit of the motor and in series with the terminals 33 and 34. The terminal 36 is permanently connected with the terminal 34 (see Fig. 4), while the terminal 37 is electrically connected with the terminal 33 through the mechanism now to be described (the connections are crossed, as shown, for convenience of assembly). A switch arm 38 is pivotally mounted upon a shaft 39 and is made of metal so as to serve as a conductor. Electrically connected with the switch arm 38 through the shaft 39 is a heating coil 40 which surrounds but is spaced from a fixed shaft 41. One end of the coil, however, is fixed to the shaft 41 and is electrically connected through the metallic supports with the shaft 39 and thus with arm 38; while the other end is connected with terminal 33. It will thus be seen that upon the closing of the switch arm 38 against terminal 37, the terminals 37 and 33 are connected, so that if at the same time the jumper 32 connects terminals 33 and 34, the circuit of the motor is closed and the motor is set into operation. Upon movement of the switch arm 38 away from the terminal 37, however, the motor circuit is open regardless of the condition of jumper 32. The function of the heating coil 40 will be explained below.

Means are also provided whereby the switch arm 38 may be manually operated, and also automatically opened when an excessive load is placed upon the motor, as for example, when the refrigerator has been permitted to heat up to approximately room temperature, which may occur when the refrigerator has not been in use for a considerable time. The arm 38 forms part of an over-center spring toggle, the other member of which comprises a crank 42 projecting from a disc 43 mounted upon the shaft 39 independently of the arm 38 and rotatable relatively to the latter. To the crank 42 is attached a spring 43a whose other end is anchored upon the arm 38. The disc is provided also with a lug 44 which engages within a groove in a manually operated plunger 45 provided with a knob 46 located outside of the casing 14. The arrangement is such that upon pulling out of the plunger 45, the crank 42 is moved to the position shown in Fig. 1, the spring 43a, as soon as crank 42 moves out of line with arm 38, carrying with it the arm 38 which is thus thrown to the closed position. Upon inward movement, i. e. pushing in, of the plunger 45, the crank 42 is moved counterclockwise until it passes the diameter through shaft 39 upon which arm 38 lies, whereupon the spring 43a operates to move the arm 38 quickly away from the terminal 37 to break the motor circuit. In this way the switch arm 38 may be manually operated to break the motor circuit when it is desired, for example, to throw the refrigerator out of operation for a considerable period of time, or to defrost the cooling coils rapidly.

Upon the shaft 41 is mounted a ratchet wheel 47 which is normally fixed to the shaft by a body of solder 48. A ratchet pawl 49 is slidably arranged within the casing and is provided with a tooth which normally engages the ratchet wheel 47 when the pawl is in its left-hand position, as shown in Fig. 1. In such position, an upwardly bent portion 50 of the pawl engages a lug 51 projecting from disc 43. The pawl 50 is constantly urged toward the right by means of a spring 52 which is connected at one end to said pawl and is anchored at its other end to a fixed support.

It will be recalled that the shaft 41 is surrounded by the heating coil 40. Assuming that the circuit of the motor has just been closed by pulling out the plunger 45, the parts being in the position shown in Fig. 1, and that the refrigerator had been permitted to attain so high a temperature that such a load is now placed upon the motor as will endanger the windings thereof, so much heat will be generated in the coil 40 as to render soft or fluid the body of solder 48 which normally holds the ratchet wheel 47 fixed upon the shaft 41. The ratchet wheel is therefore now free to rotate upon the shaft and is no longer able to hold the pawl 49 against the action of spring 52. The latter consequently moves the pawl 49 to the right, and by the engagement of the upstanding portion 50 with the lug 51, rotates the disc 43 counterclockwise, whereby the crank 42 and overthrow spring 43a are moved to the opposite side of the shaft 39, the spring 43a pulling the switch arm 38 to open position. The circuit of the motor is then broken and can be closed again only upon pulling out of the plunger 45.

It will be seen from the above that I have provided an arrangement comprising two switches in the circuit of the motor, one of which is controlled entirely by the temperature responsive mechanism, while the other is controlled by the manually operable plunger 46 and the automatic cut-out mechanism 40, 47, 49, 50, 51, and that each of such mechanisms performs its intended functions without subjecting the other to bending or distorting stresses.

It will be understood that various modifications may be resorted to within the scope of the appended claims without departing from the spirit of the invention. For example, the ratchet wheel may be permanently rigid with the shaft while the latter is seated at one or both its ends in a body of solder or other easily fusible material which becomes sufficiently soft at elevated temperatures to permit such shaft to rotate. The cut-out mechanism illustrated may be replaced by any equivalent electromagnetic or other device. In the case of a gas refrigerator, the thermostatic mechanism 11, 17, 31 may operate a valve associated with a gas port in series with a second port controlled by a manually and/or automatically operated valve.

With reference to the dial shown on Fig. 3, I wish it to be understood that the construction of the parts (particularly bellows 11, spring 23 and screw 27) whereby the control mechanism may be set from the coldest to the defrosting temperature, while remaining continuously operative to maintain the selected temperature, is not part of my invention but is the invention of Lawrence C. Irwin and is described in detail and is claimed in his copending application Serial No. 596,473, filed March 3, 1932.

It will be apparent that my improved mechanism can be made responsive both to temperature and to pressure variations; therefore where in the claims I speak of temperature or temperature responsive mechanism, the same is to be understood to include also pressure and pressure responsive mechanism, respectively, as full equivalents.

I claim:

1. In a temperature control system for controlling the motor of an automatic electric refrigerator, the combination of a housing, a temperature responsive mechanism arranged in said housing, means arranged to be operated by said responsive mechanism for controlling the circuit of the refrigerator motor at one point therein, a switch operable to control said circuit at another point therein, and safety mechanism automatically operative when an excessive flow through said circuit occurs to move said switch to open said circuit.

2. The combination as set forth in claim 1, including a member manually operable from the exterior of the housing to actuate the switch.

3. In a temperature control system for controlling the motor of an electric refrigerator, the combination of a temperature responsive mechanism for maintaining a predetermined temperature range in the refrigerator, an electric circuit for the motor of the refrigerator, a switch controlling said circuit and arranged to be operated by said responsive mechanism, means for adjusting said responsive mechanism to maintain the temperature in the refrigerator within selected limits within the range extending continuously from the minimum refrigerating temperature to a defrosting temperature, a second switch in series with said first mentioned switch and operable to control said circuit independently of said first mentioned switch, a manually operable member associated with said second-mentioned switch to actuate the same, and safety mechanism responsive to an excessive current in said circuit for opening such second switch.

4. In a temperature control system suitable for controlling the motor of an electric refrigerator, the combination of a temperature responsive mechanism for maintaining a predetermined temperature range in the refrigerator, an electric circuit for the motor of the refrigerator, a switch controlling said circuit and arranged to be operated by said responsive mechanism, a second switch in series with said first mentioned switch and operable to control said circuit independently of said first mentioned switch, and automatic safety mechanism for opening the second switch comprising a support, a member soldered to said support and connected to said switch, a spring urging said member to open the switch, and a heating coil traversed by the current of said circuit and adapted, when said current becomes excessive, to heat the solder sufficiently to render the same fluid and permit said member to move on its support and open the switch.

5. In a temperature control system for controlling the motor of an electric refrigerator, the combination of a temperature responsive mechanism for maintaining a predetermined temperature range in the refrigerator, an electric circuit for the motor of the refrigerator, a switch controlling said circuit and arranged to be operated by said responsive mechanism, a second switch in series with said first mentioned switch and operable to control said circuit independently of said first mentioned switch, and automatic safety mechanism for opening the second switch comprising a support, a member soldered to said support and connected to said switch, a spring urging said member to open the switch, an element adapted to move said switch to the open position, and means normally holding said element in an inoperative position, said means adapted upon excessive rise of the current in said circuit to release said element to move said switch to open position.

6. In a temperature control system for electric refrigerators, the combination of a temperature responsive mechanism for maintaining a predetermined temperature range in the refrigerator, an electric circuit for the motor of the refrigerator, a switch controlling said circuit and arranged to be operated by said responsive mechanism, a second switch in series with said first mentioned switch and operable to control said circuit independently of said first mentioned switch, and automatic safety mechanism for opening the second switch comprising a support, a member soldered to said support and connected to said switch, a spring urging said member to open the switch, an element operative to move said switch to the open position, a wheel cooperating with said element to hold the same in inoperative position, a shaft for loosely supporting said wheel, heat responsive means for connecting said wheel to said shaft, said means adapted upon excessive rise of current in said circuit to disconnect said wheel from said shaft to enable said element to move to operative, switch opening position.

7. In a temperature control system for electric refrigerators, the combination of a temperature responsive mechanism adapted to expand and contract in response to fluctuations in temperature at the place under control, an electric circuit for the motor of the refrigerator, a switch controlling said circuit and arranged to be operated by said responsive mechanism, a second switch in series with said first mentioned switch and operable to control said circuit independently of said first mentioned switch, and automatic safety mechanism for opening the second switch comprising a support, a member soldered to said support and connected to said second switch, a spring urging said member to open said second switch, an element operative to move such switch to the open position, a wheel cooperating with said element to hold the same in inoperative position, a shaft for loosely supporting said wheel, a body of solder between said wheel and shaft for connecting the same, and a heating coil arranged in proximity to said solder and traversed by the current of said circuit, said solder adapted upon excessive rise of current in said circuit to fuse to release said wheel from said shaft and enable said element to move to operative, switch opening position.

8. In a temperature control system for controlling the operation of an electric motor which circulates the refrigerant through an automatic refrigerator, the combination of a housing, a set of contacts in the circuit of said motor to start and stop the same in accordance with temperature variations, a separate manually operable set of contacts in series with the first mentioned contacts for making or breaking the electric circuit to the said first set of contacts, both said sets of contacts being arranged in said housing, an automatic temperature responsive mechanism also located in said housing for operating the first named set of contacts and comprising a metal bellows, a resistance spring associated with said bellows, and a switch member operated conjointly by said bellows and spring, means operable from the exterior of the housing for changing the resistance of the spring to vary the temperatures at which said switch member is operated, whereby either a refrigerating temperature range is maintained, or a sufficiently higher temperature range to defrost the refrigerator, the said responsive mechanism being so arranged as to remain fully operative in each of said two adjusted positions and in all intermediate positions of said spring-resistance modifying means.

9. In a temperature control system for controlling the operation of an electric motor which circulates the refrigerant through an automatic refrigerator, the combination of automatic temperature responsive mechanism for maintaining a predetermined temperature range in the refrigerator, a circuit for the motor of the refrigerator, a set of contacts in said circuit controlled by said responsive mechanism to start and stop the motor according as the temperature departs from the predetermined range, means for adjusting said responsive mechanism to vary the temperature range maintained thereby, said means operative to adjust said mechanism throughout the range from the minimum refrigerating temperature to a defrosting temperature, so that defrosting of the refrigerator may be effected by adjustment of such responsive mechanism within its operating range, a second set of contacts in series with the first mentioned contacts for making or breaking the electric circuit to said first set of contacts, and a manually operable member for opening or closing the said second set of contacts and thereby either disconnecting the motor from or connecting the same with the responsive mechanism.

10. In a temperature control system for controlling the flow of the energy-supplying fluid to an automatic refrigerator, the combination of a housing, control means in the circuit of said energy-supplying fluid for controlling such flow in accordance with temperature variations, a separate manually operable control means in series with the first mentioned control means for opening or closing the fluid circuit to the first control means, both of said control means being arranged in said housing, an automatic temperature responsive mechanism also located in said housing for operating the first mentioned control means, and comprising a metal bellows, a resistance spring associated with said bellows, and a control member for effecting adjustment of said first named control means and operated conjointly by said bellows and spring, means operable from the exterior of the housing for changing the resistance of the spring to vary the temperatures at which said control member is operated, whereby either a refrigerating temperature range is maintained, or a sufficiently higher temperature range to defrost the refrigerator, the said responsive mechanism being so arranged as to remain fully operative in each of said two adjusted positions, and in all intermediate positions of said spring-resistance modifying means.

11. In a temperature control system for controlling the flow of the energy-supplying fluid which effects circulation of the refrigerant through an automatic refrigerator, the combination of automatic temperature responsive mechanism for maintaining a predetermined range of temperatures in the refrigerator, an energy-supplying fluid circuit for the refrigerator, means in said circuit controlled by said responsive mechanism to regulate the flow of said energy-supplying fluid according as the temperature departs from the predetermined range, means for adjusting said responsive mechanism to vary the temperature range maintained thereby, said means being operative to adjust said mechanism throughout the range from the coldest refrigerating temperature to a defrosting temperature, so that such coldest refrigerating as well as such defrosting of the refrigerator may be effected by adjustment of such responsive mechanism within its operating range, a second control means in series with the first mentioned control means for opening and closing the fluid circuit to the first mentioned control means, and a manually operable member for opening and closing the second control means for either disconnecting the energy-supplying fluid circuit from or connecting the same with the first control means.

12. In a temperature control system for controlling the flow of the energy-supplying fluid to an automatic refrigerator, the combination of a housing, control means in the circuit of the energy-supplying fluid for controlling such flow in accordance with temperature variations, a separate control agent manually operable to open the fluid circuit irrespective of whether said first mentioned control means is or is not being urged into circuit-closing position, said control means being arranged in said housing, an automatic temperature responsive mechanism also located in said housing and arranged to urge the first mentioned control means into circuit-closing position on rise of temperature and into circuit-opening position on lowering of temperature, said mechanism comprising a metal bellows, a resistance spring associated with said bellows and a control member for effecting adjustment of said control means and operated conjointly by said bellows and spring, means operable from the exterior of the housing for changing the resistance of the spring to vary the temperatures at which said control member is operated whenever the manually operable control agent is in circuit-preparing position, whereby either a refrigerating temperature range is maintained, or a sufficiently higher temperature range to defrost the refrigerator, the said responsive mechanism being so constructed and arranged as to remain fully operative in each of said two adjusted positions, and in all intermediate positions of said spring-resistance modifying means, save when the manually operable control agent has been shifted to the open circuit position.

FRANK J. BAST.